United States Patent Office 3,808,217
Patented Apr. 30, 1974

3,808,217
1-CYCLOPROPYL-3-MONO- (AND 2,3-DI)
SUBSTITUTED-1-PROPANONES
William J. Welstead, Jr., Richmond, Va., assignor to
A. H. Robins Company, Incorporated, Richmond, Va.
No Drawing. Continuation-in-part of abandoned application Ser. No. 144,634, May 18, 1971. This application Oct. 2, 1972, Ser. No. 293,888
Int. Cl. C07d 29/20, 29/24
U.S. Cl. 260—293.8   4 Claims

ABSTRACT OF THE DISCLOSURE 1-cyclopropyl-3-mono- (and 2,3-di) substituted-1-propanones having the formula:

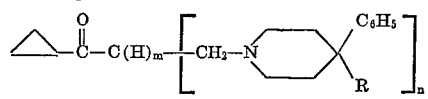

are disclosed wherein R is hydroxyl, lower-alkanoyloxy and lower-alkoxycarbonyl and $n$ and $m$ are positive integers from one to two inclusive. The lower-alkanolyoxy and lower-alkoxy carbonyl derivatives possess analgeic activity.

---

The present application is a continuation-in-part of copending application Ser. No. 144,634 filed May 18, 1971, now abandoned.

The present invention relates to novel 1-propanones and is more particularly concerned with 1-cyclopropyl-3-mono- (and 2,3-di) substituted-1-propanones, intermediates therefor, compositions thereof and methods of making and using the same.

The invention is especially concerned with novel compounds having the formula:

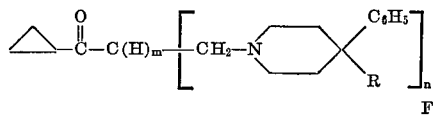

Formula I wherein:

R is hydroxyl, lower-alkanoyloxy and lower-alkoxy carbonyl, $n$ and $m$ are positive intergers from one to two inclusive with the proviso that when $n$ is one $m$ is two and when $n$ is two $m$ is one, and the pharmaceutically acceptable acid addition salts thereof.

In the difinition of the symbols in foregoing Formula I and where they appear elsewhere throughout the specification and claims thereof, the terms used herein have the following significance.

The term "lower alkyl" as used herein includes straight and branched radicals of up to eight carbon atoms inclusive and is exemplified by such groups as methyl, ethyl, propyl, isopropyl, butyl, tertiary butyl, amyl, hexyl, isoamyl, heptyl, octyl, and the like.

"Lower-alkanoyloxy" has the formula

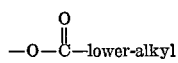

"Lower-alkoxy carbonyl" has the formula

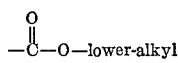

The invention also includes pharmaceutically acceptable acid addition salts of the bases of Formula I with organic and inorganic acids. Such salts are easily prepared by methods known in the art.

Exemplary of such organic salts are those formed with citric, acetic, lactic, maleic, fumaric, benzoic, tartaric, ascorbic, pamoic, succinic, methanesulfonic, malic, citraonic, itaconic acid and the like. Exemplary of such inorganic salts are those formed with hydrochloric, hydrobromic, sulfuric, phosphoric and nitric acids.

The novel concept of the invention resides in the introduction of 4,4-disubstituted piperidinylmethyl radicals into the methyl group of methylcyclopropyl ketone to give the novel compounds of the present invention having analgetic activity. The analgetic activity was determined by a modification of Nilsen's method [Funderburk, W. H., et al., Arch. Into. Pharmacodynamie 178, 446–456 (1969)].

The compounds of Examples 3 and 5, namely, 1-cyclopropyl - 3-(4-phenyl-4-propionyloxypiperidinyl)-1-propanone and 1 - cyclopropyl - 3-(4-ethoxycarbonyl-4-phenylpiperidinyl)-1-propanone hydrochloride have good analgetic activity and are the preferred compounds of the present invention.

The novel 1 - cyclopropyl-3-(4-hydroxy-4-phenylpiperidnyl)-1-propanone compound of this invention is especially useful as an intermediate for the preparation of the pharmacologically active 1 - cyclopropyl - 3-(4-lower-alkanoyloxy-4-phenylpiperidinyl)-1-propanones.

It is, accordingly, an object of the present invention to provide novel 1 - cyclopropyl - 3-(4-lower-alkanoyloxy-4-phenylpiperidinyl) - 1 - propanones and 1-cyclopropyl-3- (4 - lower - alkoxycarbonyl-4-phenylpiperidinyl)-1-propanones. Another object is to provide methods for preparing the new and useful compounds described herein. Other objects of the invention will be apparent to one skilled in the art and still other objects will become apparent hereinafter.

METHOD OF PREPARATION

The provision of the starting materials and the novel compounds of the present invention may be accomplished according to the following reactions:

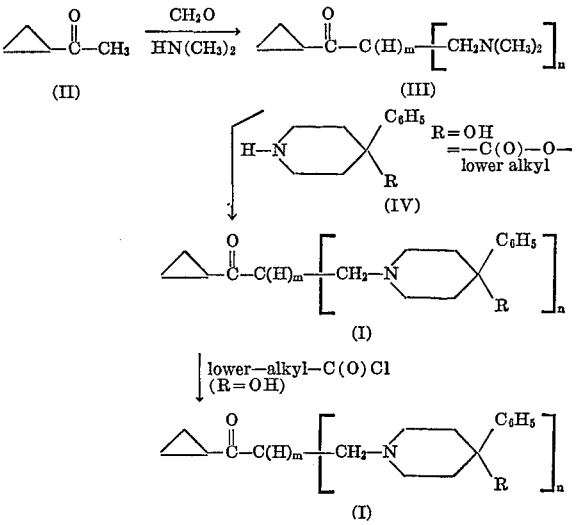

wherein R, $m$ and $n$ have the values previously assigned.

(A) Starting materials

The 1-cyclopropyl-3-dimethylamino-1-propanone (III) and 1-cyclopropyl-2-dimethylaminoethyl - 3 - dimethylamino-1-propanone (III) starting materials are prepared by reacting cyclopropyl methyl ketone (II) with a 1–30% molar excess of paraformaldehyde and dimethylamine hydrochloride in a lower alkanol solvent such as ethanol, isopropanol and n-butanol for a period of from about 12 hours to about 20 hours. The reaction is preferably run at the reflux temperature of the solvent. The mixture of basic products is isolated from the reaction mixture by basifying the reaction mixture, extraction of the base insoluble oil using a suitable solvent as, for example, ether, benzene, chloroform and the like. The crude oil is then fractionally distilled, the lower boiling fraction consisting largely of the monoamine material and the higher boiling fraction consisting largely of the diamine material. The pure monoamine and diamine is obtained by fractional crystallization of their acid addition salts, the hydrochloride acid addition salt being the preferred salt.

(B) Novel compounds

The novel compounds of Formula I may be generally prepared by reacting a 1-cyclopropyl-3-dimethylamino or a 1-cyclopropyl-2-dimethylaminomethyl-3-dimethylamino-1-propanone (III) with a 4,4-disubstituted piperidine (IV) in a suitable organic solvent, illustratively, dimethylformamide. The reaction is preferably run at a temperature of from about 60° to about 85° C. for a period of from about two hours to about 12 hours, during which reaction period the displaced dimethylamine is removed from the reaction vessel by any suitable means such as passing a current of an inert gas through the mixture or by carrying out the reaction under a slight vacuum. The removal of the dimethylamine by a suitable means such as described above is necessary to shift the equilibrium of the reaction so that optimum yields of the novel compounds of Formula I can be obtained. The reaction is run until the evolution of dimethylamine ceases. The novel compounds which are usually crystalline solids are isolated by dilution of the reaction mixture with water and collection of the solid product. The products are further purified by crystallization from a suitable solvent.

The novel compounds of Formula I wherein R is lower-alkanoyloxy may be prepared by reacting a precursor compound wherein R is hydroxy with a lower-alkanoyl chloride in a suitable solvent such as chloroform or in a heterogeneous solvent system such as chloroform-water preferably at or about 0° C. The chloroform layer is separated, dried and concentrated to an oil which is converted to a suitable acid addition salt, illustratively, the hydrochloride salt which is further purified by crystallization from a suitable solvent.

PREPARATION 1

1-cyclopropyl-3-dimethylamino-1-propanone hydrochloride

A stirred mixture of 84 g. (1 mole) of cyclopropyl methyl ketone, 40 g. (1.3 mole) of paraformaldehyde and 108 g. (1.3 moles) of dimethylamine hydrochloride in 150 ml. of isopropanol was refluxed for 18 hours. The solvent was removed under reduced pressure and the residue was treated with 500 ml. of 3 N sodium hydroxide. The free base was extracted into ether, the ether extract was dried over magnesium sulfate and the solvent evaporated to give 135 g. of an oil. The oil was distilled at 85–120° C./12 mm. Seven fractions were cut with the lower boiling fractions consisting mainly of 1-cyclopropyl-3-dimethylamino-1-propanone and the higher boiling fractions consisting mainly of 1-cyclopropyl-2-dimethylaminomethyl-3-dimethylamino-1-propanone. The lower fractions were treated with hydrogen chloride gas and the resulting precipitate which was the hydrochloride salt of the diamine (13 g., M.P. 172–174° C.) was separated by filtration. Ether was added to the filtrate to give a hygroscopic solid which was collected and dissolved in cold isopropanol. A small amount of insoluble material was removed by filtration of the isopropanol solution and the monoamine product salt in the filtrate was precipitated by adding isopropyl ether to the warmed isopropanol filtrate. The yield was 35 g. (20%); the hydrochloride salt melted at 125–126° C. The nuclear magnetic resonance spectrum confirmed the monoamine structure.

*Analysis.*—Calculated for $C_8H_{16}ClNO$ (percent): C, 54.08; H, 9.08; N, 7.88. Found (percent): C, 53.45; H, 8.96; N, 7.83.

PREPARATION 2

1-cyclopropyl-2-dimethylaminomethyl-3-dimethylamino-1-propanone dihydrochloride

The combined higher fractions of Preparation 1 were dissolved in isopropanol and the solution was treated with hydrogen chloride gas. The salt which precipitated (37 g.) melted at 172–174° C. The combined salts (13 g. from Preparation 1) weighed 50 g. (18%). Recrystallization of the salt from isopropanol did not change the melting point. The nuclear magnetic resonance spectrum confirmed the diamine structure.

*Analysis.*—Calculated for $C_{11}H_{24}Cl_2N_2O$ (percent): C, 48.71; H, 8.92; N, 10.33. Found (percent): C, 48.54; H, 9.04; N, 10.05.

The following examples are presented to illustrate the preparation of compounds of the present invention and they should not be construed as limiting it in spirit or in scope.

EXAMPLE 1

1-cyclopropyl-3-(4-hydroxy-4-phenylpiperidinyl)-1-propanone

A stirred mixture of 14 g. (0.1 mole) of 1-cyclopropyl-3-dimethylamino-1-propanone, 17.7 g. (0.1 mole) of 4-phenyl-4-piperidinol and 100 ml. of dimethylformamide was heated at 80–85° C. while a stream of nitrogen gas was passed through the mixture. After evolution of dimethylamine was complete, the mixture was cooled, diluted with ether, and the solid which separated was filtered off and washed with ether. It weighed 17 g. An additional 5 g. of product was obtained by concentration of the filtrate. The combined crops were crystallized from isopropanol-isopropyl ether to give 19 g. (70%) of pure product which melted at 138–140° C.

*Analysis.*—Calculated for $C_{17}H_{23}NO_2$ (percent): C, 74.69; H, 8.48; N, 5.12. Found (percent): C, 74.63; H, 8.35; N, 5.11.

EXAMPLE 2

1-cyclopropyl-2-(4-hydroxy-4-phenylpiperidinylmethyl)-3-(4-hydroxy-4-phenylpiperidinyl)-1-propanone A stirred mixture of 10 g. (0.037 mole) of 1-cyclopropyl - 2 - dimethylaminomethyl - 3 - dimethylamino-1-propanone dihydrochloride, 13.1 g. (0.074 mole) of 4-phenyl-4-piperidinol, 30 g. of potassium carbonate and 75 ml. of dimethylformamide was heated at 65° C. for four hours while a stream of nitrogen gas was bubbled through the mixture. The mixture was poured into water and the water insoluble product was extracted into benzene. The combined benzene extracts were dried over magnesium sulfate and evaporated to an oil which solidified on standing. Recrystallization from benzene-isooctane gave 9.3 g. (55%) of product which melted at 127–129° C.

*Analysis.*—Calculated for $C_{29}H_{38}N_2O_3$ (percent): C, 75.29; H, 8.29; N, 6.06. Found (percent): C, 75.22; H, 8.26; N, 6.11.

EXAMPLE 3

1-cyclopropyl-3-(4-phenyl-4-propionyloxypiperidinyl)-1-propanone hydrochloride

To a stirred suspension of 10 g. (0.037 mole) of 1-cyclopropyl-3-(4-hydroxy-4-phenylpiperidinyl) - 1 - propanone and 10 g. of potassium carbonate in 50 ml. chloroform was added dropwise a solution of 4.15 g. (0.045 mole) of propionyl chloride in 25 ml. of chloroform. The mixture was cooled to 0° C. and treated with 100 g. of crushed ice. After 30 minutes additional stirring, the chloroform layer was separated, dried over magnesium sulfate and stripped to an oil. The oil was dissolved in ether and hydrogen chloride gas was passed into the solution until precipitation was complete. After filtration, the solid was recrystallized twice from an isopropanol-ether mixture to yield 8 g. (60%) of product which melted at 163–165° C.

EXAMPLE 4

1-cyclopropyl-2-(4-phenyl - 4 - propionyloxypiperidinyl-methyl)-3-(4-phenyl - 4 - propionyloxypiperidinyl) - 1-propanone dihydrochloride hydrate A stirred mixture of 6.2 g. (0.0135 mole) of 1-cyclopropyl-2-(4-hydroxy-4-phenylpiperidinylmethyl) - 3 - (4-hydroxy-4-phenylpiperidinyl) - 1 - propanone and 15 g. of potassium carbonate in 25 ml. of chloroform was cooled to 0° C. and treated dropwise with 4 g.( 0.042 mole) of propionyl chloride in 25 ml. of chloroform. After stirring 30 minutes, about 50 g. of crushed ice was added to the mixture and an additional 1 g. of propionyl chloride was added. The mixture was stirred two hours, the chloroform layer was separated, dried over magnesium sulfate and evaporated to an oil. A hydrochloride salt in isopropanol was prepared using with ethereal hydrogen chloride, yielding 5 g. product (55%) melting at 85–95° C. The compound is a hydrate.

*Analysis.*—Calculated for $C_{35}H_{50}Cl_2N_2O_6$ (percent): C, 63.15; H, 7.57; N, 4.21. Found (percent): C, 62.93; H, 7.72; N, 4.44.

EXAMPLE 5

1-cyclopropyl-3-(4-ethoxycarbonyl-4-phenylpiperidinyl)-1-propanone hydrochloride A stirred mixture of 10.5 g. (0.074 mole) of 1-cyclopropyl-3-dimethylamino-1-propanone and 0.074 mole of 4-ethoxycarbonyl-4 - phenylpiperidine (prepared from 20 g. of hydrochloride salt) in 75 ml. of dimethylformamide was heated at 65–70° C. while a stream of nitrogen gas was passed through the mixture. After ten hours the evolution of dimethylamine ceased and the mixture was poured into water. The product was extracted into ether, the ether extract was dried over magnesium sulfate and treated with ethereal hydrogenchloride. The hydrogenchloride salt was collected and was crystallized from isopropanol-isopropyl ether, to give 15.5 g. (57%) of product which melted at 148–150° C.

*Analysis.*—Calculated for $C_{20}H_{28}ClNO_3$ (percent): C, 65.65; H, 7.71; N, 3.83. Found (percent): C, 65.34; H, 7.69; N, 3.84.

EXAMPLE 6

When in the procedure of Examples 3 and 4, propionyl chloride is replaced by an equal molar amount of acetyl chloride, and
butyryl chloride, there are obtained 1-cyclopropyl-3-(4-phenyl-4 - acetyloxypiperidinyl) - 1-propanone,
1-cyclopropyl-3-(4-phenyl - 4 - butyryloxypiperidinyl)-1-propanone,
1-cyclopropyl-2-(4 - acetyloxy - 4 - phenylpiperidinyl-methyl)-3-(4 - acetoxy - 4 - phenylpiperidinyl) - 1 - propanone, and
1-cyclopropyl-2-(4-butyryloxy - 4 - phenylpiperidinyl-methyl)-3 - (4 - butyryloxy - 4 - phenylpiperidinyl) - 1-propanone.

EXAMPLE 7

When in the procedure of Example 5, 4-ethoxycarbonyl-4 - phenylpiperidine is replaced by equal molar amounts of 4-methoxycarbonyl-4-phenylpiperidine,
4-propoxycarbonyl-4-phenylpiperidine, and
4-butoxycarbonyl-4-phenylpiperidine there are obtained 1-cyclopropyl-3-(4-methoxycarbonyl - 4 - phenylpiperidinyl)-1-propanone,
1-cyclopropyl-3-(4-propoxycarbonyl - 4 - phenylpiperidinyl)-1-propanone, and
1-cyclopropyl-3-(4-butoxycarbonyl - 4 - phenylpiperidinyl)-1-propanone.

FORMULATION AND ADMINISTRATION

Effective quantities of any of the foregoing pharmacologically active compounds may be administered to a living animal body in any one of various ways, for example, orally as in capsules, tablets, or parenterally in the form of sterile solutions or suspensions. Unit dosages are usually five milligrams or above, and preferably twenty-five, fifty or one hundred milligrams. Among the pharmaceutical excipients which can be used are gelatin, talc, lactose, magnesium carbonate and sodium carboxymethyl-cellulose.

What is claimed is:

1. A compound selected from those having the formula:

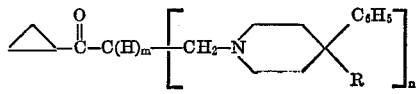

wherein;

R is selected from hydroxyl, lower-alkanoyloxy and lower-alkoxycarbonyl, m and n are each one and two with the proviso that when m is one n is two and when m is two n is one, and the pharmaceutically acceptable acid addition salts thereof.

2. The compound of claim 1 which is 1-cyclopropyl-3-(4-propionyloxy-4-phenylpiperidinyl)-1-propanone.

3. The compound of claim 1 which is 1-cyclopropyl-3-(4-ethoxycarbonyl-4-phenylpiperidinyl)-1-propanone.

4. The compound of claim 1 which is 1-cyclopropyl-3-(4-hydroxy-4-phenylpiperidinyl)-1-propanone.

References Cited

UNITED STATES PATENTS 3,551,433   12/1970   Hydro et al. ------ 260—293.8

OTHER REFERENCES

JACS 70: 4230–4232 (1948), Synder et al.
Fundamentals of Physical Chemistry (1959), Crockford and Knight, pp. 172–173.

HENRY R. JILES, Primary Examiner

S. D. WINTERS, Assistant Examiner

U.S. Cl. X.R.

260—293.64, 563 R; 424—267